(12) United States Patent
Hu et al.

(10) Patent No.: US 10,812,483 B2
(45) Date of Patent: Oct. 20, 2020

(54) ACCOUNT LOGIN METHOD AND APPARATUS

(71) Applicant: Tencent Technology (Shenzhen) Company Limited, Shenzhen (CN)

(72) Inventors: Yuhui Hu, Shenzhen (CN); Huankui Chen, Shenzhen (CN); Jingbin Hu, Shenzhen (CN); Yuefeng Zeng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 309 days.

(21) Appl. No.: 15/937,224

(22) Filed: Mar. 27, 2018

(65) Prior Publication Data

US 2018/0219864 A1 Aug. 2, 2018

Related U.S. Application Data

(63) Continuation of application No. PCT/CN2016/106345, filed on Nov. 18, 2016.

(30) Foreign Application Priority Data

Dec. 8, 2015 (CN) .......................... 2015 1 0898239

(51) Int. Cl.
*H04L 29/04* (2006.01)
*G06F 21/00* (2013.01)
(Continued)

(52) U.S. Cl.
CPC ............ *H04L 63/10* (2013.01); *G06K 7/1417* (2013.01); *G09C 5/00* (2013.01); *H04L 9/0891* (2013.01);
(Continued)

(58) Field of Classification Search
CPC ..... H04L 63/10; H04L 9/0891; H04L 9/3297; H04L 63/108; H04L 63/083;
(Continued)

(56) References Cited

U.S. PATENT DOCUMENTS 8,327,428 B2 * 12/2012 Bailey ..................... G06F 21/41
726/8
9,203,824 B1 12/2015 Nunn et al.
(Continued)

FOREIGN PATENT DOCUMENTS

| CN | 103457951 A | 12/2013 |
| CN | 103475476 A | 12/2013 |

(Continued)

OTHER PUBLICATIONS

Office Action dated Jun. 11, 2019 for Chinese Application No. 201510898239.X with concise English Translation, 10 pages.

(Continued)

*Primary Examiner* — Lisa C Lewis
(74) *Attorney, Agent, or Firm* — Brinks, Gilson & Lione

(57) ABSTRACT

A server, primary client device, and secondary device may be provided. The server may be configured to receive a login request sent by a secondary client device, the login request including a secondary account identifier and an encoded image, the secondary account identifier associated with a secondary account. The server may decode the encoded image to identify a primary account identifier and an expiration time indicator encoded in the encoded image. The server may determine that the secondary account is linked with a primary account. The server may compare the expiration time indicator with the request time to determine that the encoded image has not expired. The server may authorize privileged communication with the secondary client device in response to the secondary account being linked with the primary account and determination that the encoded image has not expired.

18 Claims, 7 Drawing Sheets

100

Receive a login request sent by a secondary account client, the login request including information about a secondary account and a Quick Response Code, the Quick Response Code including information about a primary account and time validity information of the Quick Response Code, and the time validity information being used for indicating a valid duration of the Quick Response Code — 110

Allow a login by the secondary account client when it is determined, according to the login request, that there is a primary-secondary relationship between the primary account and the secondary account, and that the Quick Response Code is valid — 120

(51) Int. Cl.
  *H04L 29/06* (2006.01)
  *G09C 5/00* (2006.01)
  *H04L 9/08* (2006.01)
  *H04L 9/32* (2006.01)
  *G06K 7/14* (2006.01)
  *H04W 12/00* (2009.01)

(52) U.S. Cl.
  CPC .......... *H04L 9/3226* (2013.01); *H04L 9/3297* (2013.01); *H04L 63/08* (2013.01); *H04L 63/083* (2013.01); *H04L 63/108* (2013.01); *H04W 12/00522* (2019.01)

(58) Field of Classification Search
  CPC ... H04L 9/3226; H04L 63/08; H04L 63/0815; G09C 5/00; G06K 7/1417; G06K 7/10; H04W 12/00522
  See application file for complete search history.

(56) References Cited

U.S. PATENT DOCUMENTS

| | | | | |
|---|---|---|---|---|
| 9,491,155 B1* | 11/2016 | Johansson | ........... | H04L 63/0807 |
| 9,544,143 B2* | 1/2017 | Oberhelde | ........... | G06F 21/31 |
| 2013/0003106 A1* | 1/2013 | Nishida | ........... | G06K 15/4095 358/1.14 |
| 2013/0219479 A1 | 8/2013 | DeSoto et al. | | |
| 2014/0033286 A1* | 1/2014 | Zhang | ........... | H04W 12/06 726/7 |
| 2014/0325623 A1* | 10/2014 | Johansson | ........... | H04L 63/0823 726/6 |
| 2016/0066064 A1* | 3/2016 | Chesluk | ........... | H04N 21/23418 725/93 |
| 2016/0323231 A1* | 11/2016 | Lee | ........... | H04L 51/32 |
| 2019/0097996 A1* | 3/2019 | Gong | ........... | H04L 63/0884 |

FOREIGN PATENT DOCUMENTS

| | | |
|---|---|---|
| CN | 103685311 A | 3/2014 |
| CN | 104519197 A | 4/2015 |
| CN | 105100009 A | 11/2015 |
| CN | 105119931 A | 12/2015 |
| CN | 105516135 A | 4/2016 |

OTHER PUBLICATIONS

International Search Report with English translation, dated Dec. 28, 2016, pp. 1-5, International Application No. PCT/CN2016/106345, State Intellectual Property Office of the P.R. China, Beijing, China.

* cited by examiner

ACCOUNT LOGIN METHOD AND APPARATUS

RELATED APPLICATION

This application is a continuation of International Application PCT/CN2016/106345, filed Nov. 18, 2016, which claims priority to Chinese Patent Application No. 201510898239.X, entitled "ACCOUNT LOGIN METHOD AND APPARATUS", filed on Dec. 8, 2015, both of which are incorporated herein by reference in their entirety.

FIELD OF THE TECHNOLOGY

This disclosure relates to data security and, more particularly, to controlling access to one or more accounts with image-based data.

BACKGROUND OF THE DISCLOSURE

Controlling access to account-related information commonly includes passing usernames and/or passwords to authenticate and authorize access to the information. Traditional systems are prone to security vulnerabilities as usernames and passwords are forged, replicated, and/or misappropriated. Moreover, in hierarchical account systems where there are numerous sub accounts associated with a main account, a password is likely to be leaked due to the large number of sub accounts. Present approaches to authentication and authorization suffer from a variety of drawbacks, limitations, and disadvantages. There is a need for the inventive components, apparatuses, systems and methods disclosed herein.

SUMMARY

Embodiments of this application provide an account login method and apparatus, so as to improve account login security.

According to an aspect of this disclosure, an account login method is provided. The account login method may include receiving a login request sent by a secondary account client. The login request may include information about a secondary account and a Quick Response Code. The Quick Response Code may include information about a primary account and time validity information of the Quick Response Code. The time validity information may be used for indicating a valid duration of the Quick Response Code. The account login method may further include allowing a login by the secondary account client when it is determined, according to the login request, that there is a primary-secondary relationship between the primary account and the secondary account, and that the Quick Response Code is valid.

According to another aspect, the account login method may further include generating, by a primary account client, a Quick Response Code. The Quick Response Code may include information about a primary account and time validity information of the Quick Response Code. The time validity information may be used for indicating a valid duration of the Quick Response Code. The account login method may further include providing, by the primary account client, the Quick Response Code to a secondary account client, so that the secondary account client sends a login request that includes the Quick Response Code to a server.

According to another aspect, the account login method may include obtaining, by a secondary account client, a Quick Response Code. The Quick Response Code may include information about a primary account and time validity information of the Quick Response Code. The time validity information may be used for indicating a valid duration of the Quick Response Code. The account login method may further include sending, by the secondary account client, a login request to a server. The login request may include information about a secondary account and the Quick Response Code.

According to another aspect, an account login apparatus is provided. The account login apparatus may include a receiving module. The receiving module may receive a login request sent by a secondary account client. The login request may include information about a secondary account and a Quick Response Code. The Quick Response Code may include information about a primary account and time validity information of the Quick Response Code. The time validity information may be used for indicating a valid duration of the Quick Response Code. The account login apparatus may further include a processing module. The processing module may allow a login by the secondary account client when it is determined according to the login request, that there is a primary-secondary relationship between the primary account and the secondary account, and that the Quick Response Code is valid.

According to another aspect, an account login apparatus is provided, where the apparatus is a primary account client. The login apparatus may include a generation module. The generation module may generate a Quick Response Code. The Quick Response Code may information about a primary account and time validity information of the Quick Response Code. The time validity information may be used for indicating a valid duration of the Quick Response Code. The account login apparatus may further include a providing module. The providing module may provide the Quick Response Code to a secondary account client, so that the secondary account client sends a login request that includes the Quick Response Code to a server.

According to another aspect, an account login apparatus is provided, where the apparatus is a secondary account client. The account login apparatus may include an obtaining module. The obtaining module may obtain a Quick Response Code. The Quick Response Code may include information about a primary account and time validity information of the Quick Response Code. The time validity information may be used for indicating a valid duration of the Quick Response Code. The account login apparatus may further include a sending module. The sending module may send a login request to a server. The login request may include information about a secondary account and the Quick Response Code.

In the embodiments of this application, a secondary account is logged in to by using a Quick Response Code, so that login security and convenience can be improved. In addition, because information about the Quick Response Code has a valid duration, the secondary account is not permitted to be permanently logged in to. Therefore, the secondary account can be prevented from being maliciously used after being stolen.

BRIEF DESCRIPTION OF THE DRAWINGS

To describe the technical solutions in the embodiments of the present invention or in the existing technology more clearly, the following briefly describes the accompanying drawings for describing the embodiments or the existing technology. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Figure 1:
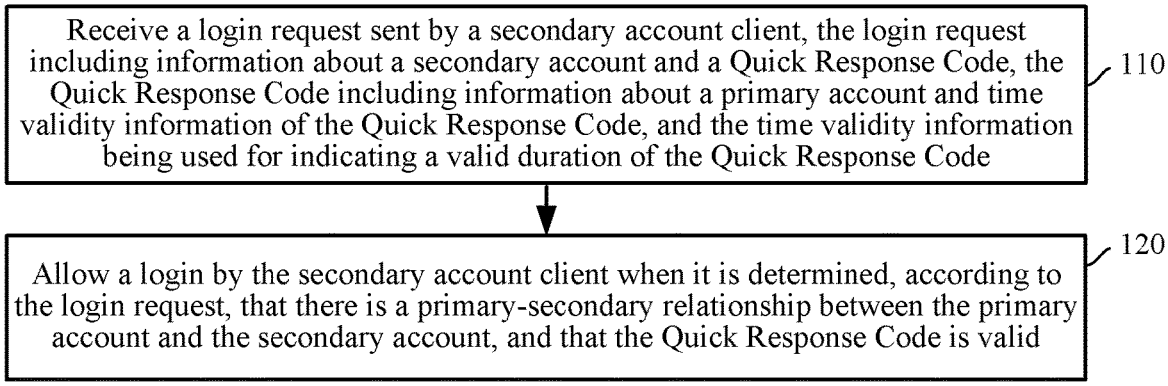
FIG. 1 is a schematic flowchart of an account login method according to an embodiment of this application.

By way of introductory example, an account login system is provided. The account login system may comprise a server. The server may be configured to receive, at a request time, a login request sent by a secondary client device, the login request may include a secondary account identifier and an encoded image. The secondary account identifier may be associated with a secondary account. The server may decode the encoded image to identify a primary account identifier and an expiration time indicator encoded in the encoded image. The primary account identifier may be associated with a primary account. The server may determine that the secondary account is linked with the primary account. The secondary account may correspond to the secondary client device and the primary account corresponding to a primary client device. The server may compare the expiration time indicator with the request time to determine that the encoded image has not expired. The server may authorize privileged communication with the secondary client device in response to the secondary account being linked with the primary account and determination that the encoded image has not expired.

The following describes the technical solutions in the embodiments with reference to the accompanying drawings. Apparently, the described embodiments are merely some but not all of the embodiments. All other embodiments obtained by a person of ordinary skill in the art based on the embodiments shall fall within the protection scope of the present disclosure.

Embodiments of this application provide two types of clients, that is, a primary account client and a secondary account client. The primary account can manage the secondary account of the primary account. For example, the primary account adds or deletes the secondary account, or grants a permission to or withdraws a permission from the secondary account. A server in the embodiments of this application is used for providing services to the primary account client and the secondary account client. As described herein the secondary account client may be interchangeably referred to as a secondary client device. In addition, the primary account client may be interchangeably referred to as a primary client device.

A primary-secondary account login solution may be based on permission management. A primary account may manage a secondary account of the primary account. For example, the primary account may add or delete the secondary account, or grant permission to the secondary account, or withdraw permission from the secondary account. The secondary account and the primary account may be independent, and a login in to the secondary account is not limited by the primary account. If a password of the secondary account is leaked, another person may have a permission to access the secondary account. Because there is a relatively large quantity of secondary accounts, a password may be leaked.

An interesting feature of the systems and method described may be that an encoded image, for example a Quick Response Code, may include information related to the primary account and expiration information that dictates when the encoded image expires. A secondary device may provide the encoded image to a server in order to log into the server. The server may receive the encoded image in addition to a username and/or password thereby improving security. The encoded image may be encrypted and/or have a limited validity duration thereby lowering the chances of malicious and/or unauthorized access to the server, the secondary account, and/or the primary account. Additional or alternative benefits and market improvements are made apparent in the system and methods described below.

FIG. 1 is a schematic flowchart of an account login method 100 according to an embodiment of this application. As shown in FIG. 1, the method 100 includes:

110: Receive a login request sent by a secondary account client, the login request including information about a secondary account and a Quick Response Code. The Quick Response Code may include information about a primary account and time validity information of the Quick Response Code, and the time validity information being used for indicating a valid duration of the Quick Response Code. For example, the login information may include an identifier of the secondary account. The time validity information may include an expiration time indicator. The time expiration indicator may include a time range, a duration, an expiration time, or any other information that corresponds to when the Quick Response Code is valid and/or no longer valid.

The secondary account may be an account associated with the primary account. For example, the secondary account may include a sub-account of the primary account. The sub account may be created and/or managed by the primary account. For example, the primary account may have access to privileged information or privileged abilities no available to the secondary account.

120: Allow a login by the secondary account client when it is determined, according to the login request, that there is a primary-secondary relationship between the primary account and the secondary account, and that the Quick Response Code is valid. For example, the method may include decoding the quick response code to identify time validity information and the primary account information. The method may further include determining that the secondary account is linked with the primary account. The secondary account may correspond to the secondary client device, for example the secondary account client. The primary account may correspond to a primary client device, for example the primary account client. The method may further include comparing the time validity information with a request time of the login request to determine that the quick response code has not expired. The method may include authorizing privileged information related to the secondary account to be communicated to the secondary client device in response to the secondary account being linked with the primary account and/or determination that the quick response code has not expired.

After receiving the login request, the server may determine, according to information about a primary account and information about a secondary account that are in the login request, whether there is a primary-secondary relationship between the primary account and the secondary account, and determine, according to whether a time at which the login request is sent is within a valid duration of the Quick Response Code, whether the Quick Response Code is valid. In other words, the server may determine if a link exists between the primary account and the secondary account. The link may include an association in a database included in the server. For example, the link may include a table that includes a primary account identifier and a secondary account identifier. The primary account identifier may identify the primary account and the secondary account identifier may identify the secondary account. If there is a primary-secondary relationship between the primary account and the secondary account, and the Quick Response Code is valid, a login by the secondary account client may be accepted. For example, the server may authorize privileged communication with the secondary client device in response to the secondary account being linked with the primary account and determination that the encoded image has not expired.

In this way, in this embodiment of this application, a secondary account is logged in to by using a Quick Response Code, so that login security and convenience can be improved. In addition, because information about the Quick Response Code has a valid duration, the secondary account is not permitted to be permanently logged in to. Therefore, the secondary account can be prevented from being maliciously used after being stolen.

Optionally, in this embodiment of this application, a login by the secondary account client is rejected when it is determined that there is no primary-secondary relationship between the primary account and the secondary account, or that the Quick Response Code is invalid.

Optionally, in this embodiment of this application, the Quick Response Code may be an encrypted Quick Response Code. That is, when generating the Quick Response Code, the primary account client encrypts the Quick Response Code and/or information represented by the Quick Response Code. For example, the Quick response code may include encoded information. The encoded information may include the time validity information and the primary account information. The encoded information may be encrypted. The encoded information may be decrypted to identify the primary account information and the time validity information in the Quick Response Code. In some examples, the secondary account client may obtain the encrypted Quick Response Code, and directly sends the encrypted Quick Response Code to the server by using the login request. The server decrypts the Quick Response Code, to obtain the information about the primary account and the time validity information.

By encrypting the Quick Response Code, the Quick Response Code can be prevented from being maliciously tampered with during transmission.

Optionally, in this embodiment of this application, the server may instruct the primary account client to regularly update the Quick Response Code. Specifically, an updating period and an updating rule may be sent to the primary account client. The updating period may include a time period such as a time interval. The primary account client sets a Quick Response Code according to the updating period and the updating rule. For example, the valid duration may be updated, or the primary account may be updated (For example, an identifier is updated). In other words, the server may send an instruction to the second client device to update the expiration time indicator represented by the encoded image at a predetermined time interval.

Certainly, in this embodiment of this application, the primary account client may further generate and/or actively update the Quick Response Code, and inform the server of the Quick Response Code or updates to the Quick Response Code. Alternatively or in addition, the server may update the Quick Response Code according to the updating period and the updating rule, to obtain an updated Quick Response Code and directly send the Quick Response Code to the primary account client. Then, the primary account client provides the Quick Response Code to the secondary account client. In other words, the server may repeatedly update, at a regular time interval, the encoded image to represent a new expiration time indicator. The server may communicate, in response to the encoded image being updated, the encoded image to the primary client device.

Figure 2:
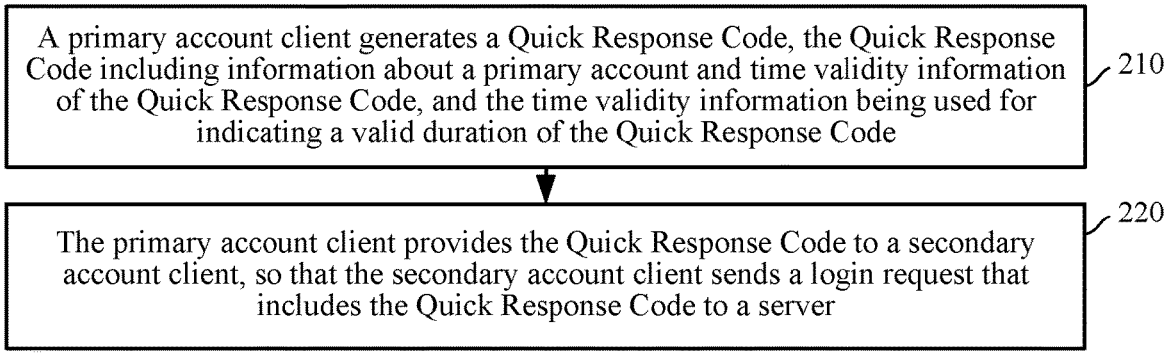
FIG. 2 is a schematic flowchart of an account login method according to another embodiment of this application.

FIG. 2 is a schematic flowchart of an account login method 200 according to an embodiment of this application. As shown in FIG. 2, the method 200 includes:

210: A primary account client generates a Quick Response Code, the Quick Response Code including information about a primary account and time validity information of the Quick Response Code, and the time validity information being used for indicating a valid duration of the Quick Response Code. In other words, the time validity information may include the expiration time indicator. The expiration time indicator may include a time range, a duration, an expiration time, or any other information that corresponds to when the Quick Response Code is valid and/or no longer valid. The information about the primary account may include a primary account identifier that identifies the primary account.

220: The primary account client provides the Quick Response Code to a secondary account client, so that the secondary account client sends a login request that includes the Quick Response Code to a server.

In this embodiment of this application, a primary account client may generate a Quick Response Code, and provide the Quick Response Code to a secondary account client. The secondary account client may send a login request that includes the Quick Response Code to a server. After receiving the login request, if it is determined that there is a primary-secondary relationship between the primary account and the secondary account, and the Quick Response Code is valid, the server may accept a login by the secondary account client. Alternatively or in addition, the primary account client may encode an encoded image with authentication information. The authentication information comprising a primary account identifier and an expiration time indicator, the primary account identifier corresponding to a primary account. The primary account client may encrypt the authentication information and/or the encoded image. In some examples, the primary account client may communicate the encoded image to the secondary client device, In this way, in this embodiment of this application, a secondary account is logged in to by using a Quick Response Code, so that login security and convenience can be improved. In addition, because information about the Quick Response Code has a valid duration, the secondary account is not permitted to be permanently logged in to. Therefore, the secondary account can be prevented from being maliciously used after being stolen.

Optionally, in this embodiment of this application, the Quick Response Code may be an encrypted Quick Response Code. That is, when generating the Quick Response Code, the primary account client encrypts the Quick Response Code. The secondary account client obtains the encrypted Quick Response Code, and directly sends the encrypted Quick Response Code to the server by using the login request. The server decrypts the Quick Response Code, to obtain the information about the primary account and the time validity information.

Optionally, in this embodiment of this application, that the primary account client generates a Quick Response Code includes updating, by the primary account client, the time validity information regularly according to an instruction of the server. For example, the primary account client may receive an instruction from the server to update the Quick Response Code at a regular interval. The primary account client may render a new image for the Quick Response Code according to the instruction. For example, the primary account client may repeatedly render a new image for the Quick Response Code at the regular interval. The new image may include updated time validity information. For example, the updated time validity information may include an updated expiration time indicator. In some examples, to communicate the Quick Response Code, the second account client may display the Quick Response Code. Alternatively or in addition, the secondary account client may receive instructions, for example HTML, from the server for displaying the quick response code and display the quick response code according to the instructions.

Figure 3:
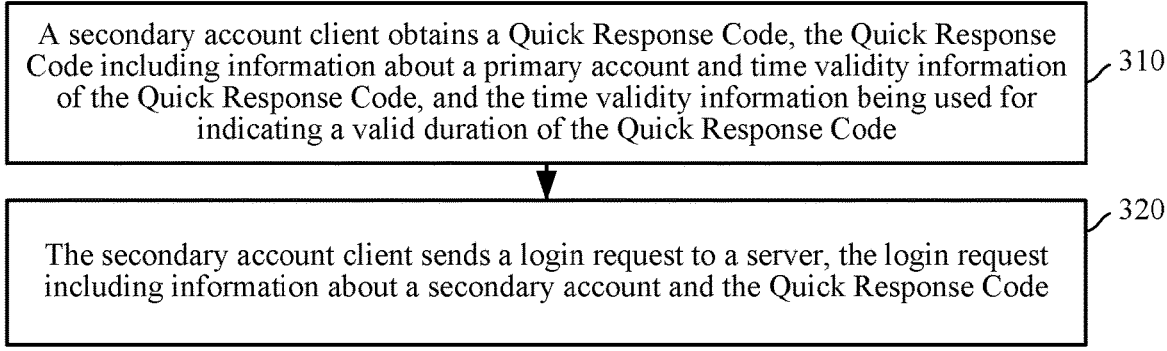
FIG. 3 is a schematic flowchart of an account login method according to another embodiment of this application.

FIG. 3 is a schematic flowchart of an account login method 300 according to an embodiment of this application. As shown in FIG. 3, the method 300 includes:

310: A secondary account client obtains a Quick Response Code, the Quick Response Code including information about a primary account and time validity information of the Quick Response Code, and the time validity information being used for indicating a valid duration of the Quick Response Code.

320: The secondary account client sends a login request to a server, the login request including information about a secondary account and the Quick Response Code.

In this embodiment of this application, a primary account client may generate a Quick Response Code, and provide the Quick Response Code to a secondary account client. The secondary account client may send a login request that includes the Quick Response Code to a server. After receiving the login request, if it is determined that there is a primary-secondary relationship between the primary account and the secondary account, and the Quick Response Code is valid, the server may accept a login by the secondary account client.

In this way, in this embodiment of this application, a secondary account is logged in to by using a Quick Response Code, so that login security and convenience can be improved. In addition, because information about the Quick Response Code has a valid duration, the secondary account is not permitted to be permanently logged in to. Therefore, the secondary account can be prevented from being maliciously used after being stolen.

In some examples, the secondary account client may receive an encrypted Quick Response Code. For example, the encrypted quick response code may include authentication information that is encrypted. The authentication information may include information about the primary account and the time validity information. Alternatively or in addition, the Quick Response code may include an encrypted image.

The foregoing describes the account login method in the embodiments of this application with reference to FIG. 1 to FIG. 3 and from the perspective of a server side, a primary client side, and a secondary client side. The following describes the account login method in the embodiments of this application with reference to FIG. 4 and FIG. 5 and from an overall perspective.

Figure 4:
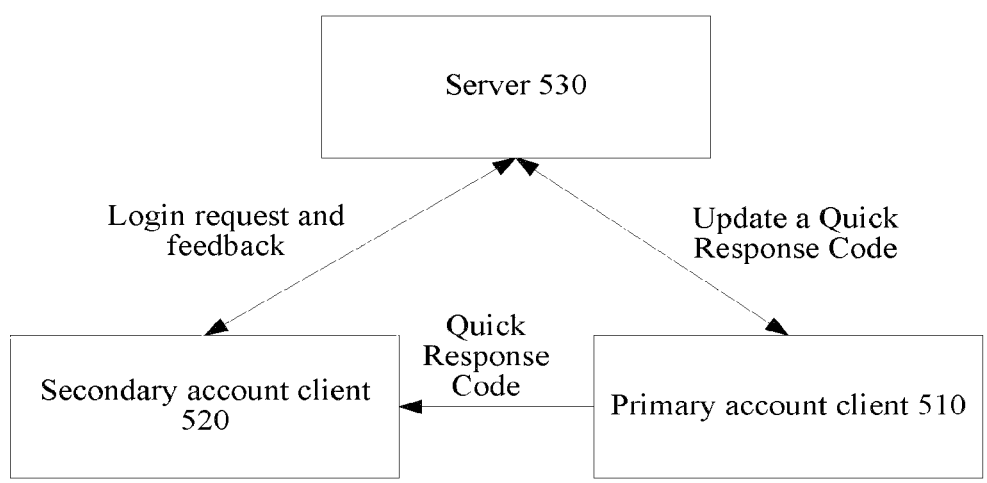
FIG. 4 is a block diagram of a system to which an account login method is applied according to another embodiment of this application.

FIG. 4 is a block diagram of a system to which the account login method may be applied. As shown in FIG. 4, the system includes: a primary account client 510, a secondary account client 520, and a server 530. The primary account client 510 and the server 530 can exchange an updated Quick Response Code. The primary account client 510 may send the Quick Response Code to the secondary account client 520. The secondary account client 520 sends a login request that carries the Quick Response Code to the server. The server 530 feeds back a processing result of the login request to the secondary account client 520.

Figure 5:
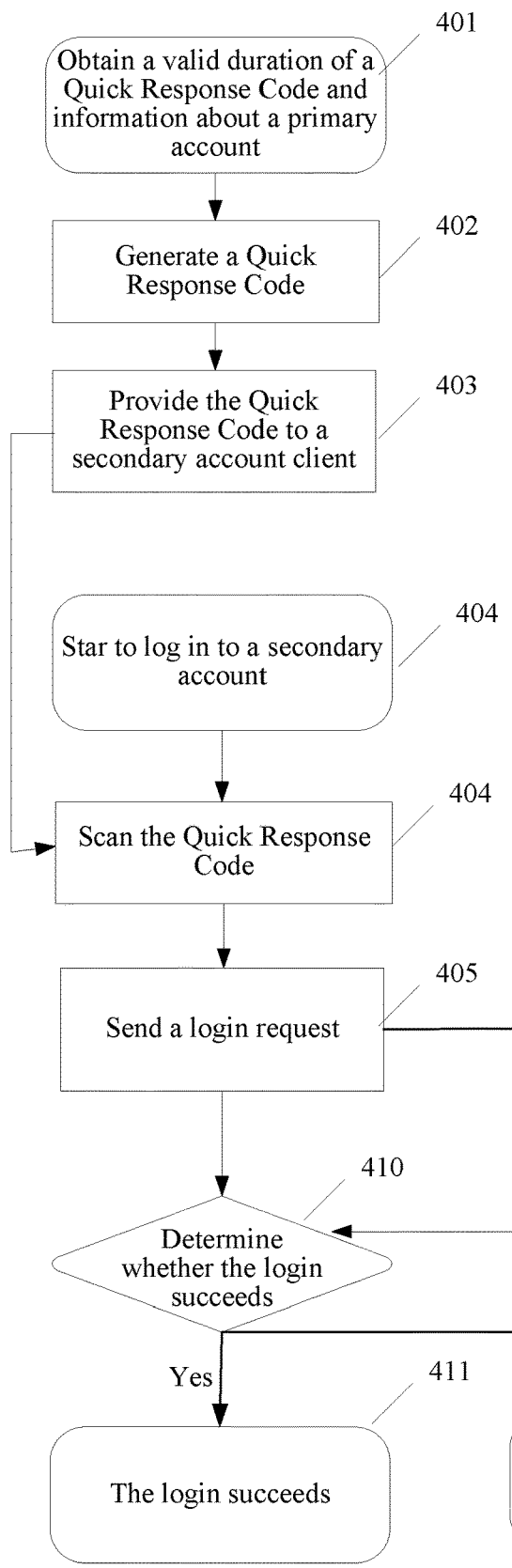
FIG. 5 is a schematic flowchart of an account login method according to another embodiment of this application.
Figure 5:
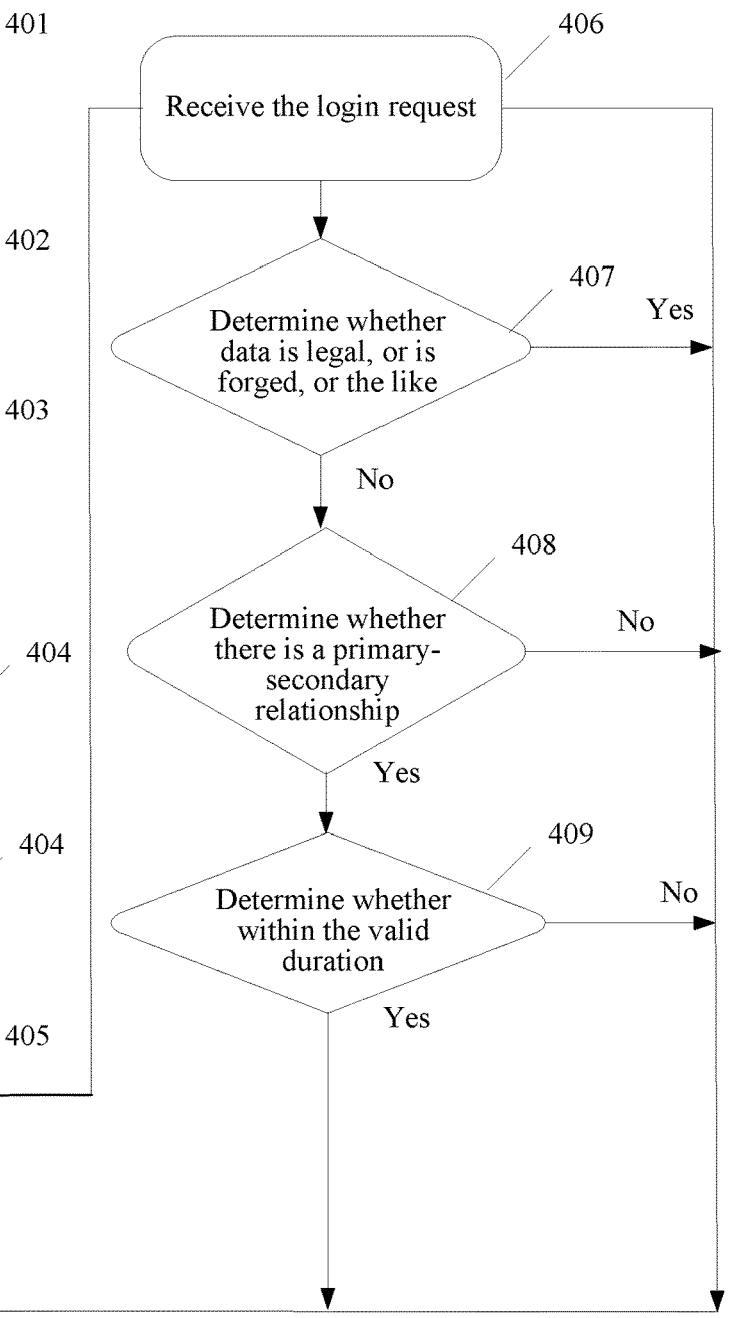

FIG. 5 is a schematic flowchart of an account login method 400 according to an embodiment of this application. As shown in FIG. 5, the logic 400 includes:

(1) A primary account client side 510:

401: Determine a valid duration of a Quick Response Code and a primary account.

402: Generate an encrypted Quick Response Code according to the valid duration and the primary account.

403: Provide the Quick Response Code to a secondary account client. For example, the Quick Response Code is presented on the primary account client (for example, on a web page), so that the Quick Response Code can be scanned by the secondary account client. Alternatively, the Quick Response Code is sent to the secondary account client by sending a message.

(2) The secondary account client side 520:

404: Start to log in to a secondary account.

405: Scan the Quick Response Code. For example, the logic may cause a capture device, such as a camera or scanner, to capture the Quick Response Code. The Quick Response Code may be captured from a screen or a printed medium.

406: Add the Quick Response Code and information about the secondary account to a login request, and send the login request to a server for requesting to log in to.

(3) The server 530 side:

406: Receive the login request sent by the secondary account client.

407: Decrypt the login request, and perform the following judgments:

determining whether data of the login request is legal, for example, determining whether a protocol format is correct, and whether the login request comes from a secure communication channel;

determining whether the login request is forged, that is, whether the login request is directly created by an attacker. Whether the login request is forged can be determined according to whether the decryption succeeds;

determining whether the login request sent by the secondary account client is intercepted and tampered with by an attacker. Whether the login request is intercepted and tampered with by an attacker can be determined according to whether the decryption succeeds;

if the data of the login request is illegal, or it is determined that the login request is forged, or the login request is tampered with, rejecting a login by the secondary account client, and returning a feedback indicating that the login by the secondary account client is rejected; or if the data of the login request is legal, and it is determined that the login request is not forged, and that the login request is not tampered with, performing 408.

In some examples, the logic may include an operation to decrypt the Quick Response Code. To decrypt the quick response code, the logic may include one or more operations to access decryption information and process the quick response code according to the decryption information. For example, the quick response code may include encoded information, including for example authentication information. The authentication information may include the information about the primary account and the time validity information. The authentication information may be encrypted. For example, the primary account client may encrypt the authentication information and/or the quick response code based in the encryption information and the server may decrypt the encoded information according to the decryption information.408: Determine whether there is a primary-secondary relationship between the primary account and the secondary account. If there is a primary-secondary relationship between the primary account and the secondary account, perform 409. If there is no a primary-secondary relationship between the primary account and the secondary account, reject a login by the secondary account client (412), and return a feedback indicating that the login by the secondary account client is rejected.

410: Determine whether a time at which the login request is sent is within a valid duration of the Quick Response Code (or only determine whether a current time is within the valid duration of the Quick Response Code). If the time at which the login request is sent is within the valid duration of the Quick Response Code, accept a login by the secondary account client, and return a feedback indicating that the login by the secondary account client is accepted. Alternatively or in addition, the logic may include authorizing privileged communication the secondary client device in response to the secondary account being linked with the primary account and/or in response to determination that the quick response code has not expired. The privileged communication may include the performance of actions related to the secondary account that require authorization. Alternatively or in addition, the privilege communication may include the communication of privileged information related to secondary account and/or primary account. In some examples, the logic may include controlling access to the secondary account and/or information related to the secondary account. For example, the logic may include an operation to grant, to the secondary client device, access to the secondary client account in response to the secondary account being linked with the primary account and/or in response to determination that the quick response code has not expired.

If the time at which the login request is sent is not within the valid duration of the Quick Response Code, reject a login by the secondary account client, and return a feedback indicating that the login by the secondary account client is rejected. Alternatively or in addition, the logic may include an operation to compare the expiration time indicator with the request time to determine that the Quick Response Code has expired. In addition, the logic may include an operation to prohibit the privileged information from being communicated to the first client device in response to determination that the Quick Response Code has expired.

(4) The secondary account client side:

410: Receive the feedback from the server, and determine whether the login succeeds. If the login succeeds, perform 411. If the login fails, perform 412.

411: Present "login succeeds" to a user.

412: Present "login fails" to a user.

In this way, in this embodiment of this application, a secondary account is logged in to by using a Quick Response Code, so that login security and convenience can be improved. In addition, because information about the Quick Response Code has a valid duration, the secondary account is not permitted to be permanently logged in to. Therefore, the secondary account can be prevented from being maliciously used after being stolen. Further, the Quick Response Code can be encrypted, thereby further improving account login security.

Figure 6:
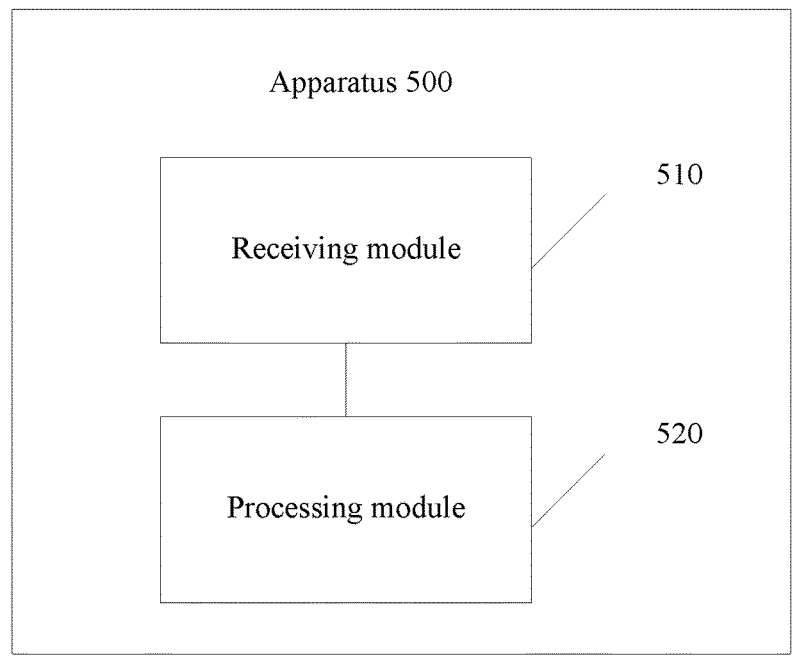
FIG. 6 is a schematic block diagram of an account login apparatus according to another embodiment of this application.

FIG. 6 is a schematic block diagram of an account login apparatus 500 according to an embodiment. As shown in FIG. 6, the apparatus 500 may include a receiving module 510, configured to receive a login request sent by a secondary account client, the login request including information about a secondary account and a Quick Response Code, the Quick Response Code including information about a primary account and time validity information of the Quick Response Code, and the time validity information being used for indicating a valid duration of the Quick Response Code. In other words, the receiving module 510 may receive, at a request time, a login request sent by a secondary client device, the login request including a secondary account identifier and an encoded image, the secondary account identifier associated with a secondary account. Bar code image may include the primary account identifier and/or time expiration information. The time expiration information. The time expiration information may include information indicative of when the encoded image, or information encoded in the image, expires or otherwise becomes invalid.

The apparatus 500 may include a processing module 520, configured to allow a login by the secondary account client when it is determined, according to the login request, that there is a primary-secondary relationship between the primary account and the secondary account, and that the Quick Response Code is valid. In other words, the processing module 520 may decode an encoded image to identify a primary account identifier and an expiration time indicator, the primary account identifier associated with a primary account. The primary account corresponding to the primary client device. The processing module 520 may determine that the secondary account is linked with the primary account, the secondary account corresponding to the secondary client device and the primary account corresponding to a primary client device. The processing module 520 may compare the expiration time indicator with the request time to determine that the encoded image has not expired. In addition, the processing module 520 may grant, to the secondary device, access to the secondary account. For example, the processing module 520 may authorize privileged communication with the secondary client device in response to the secondary account being linked with the primary account and determination that the encoded image has not expired.

In some examples, the processing module 520 may be configured to reject a login by the secondary account client when it is determined that there is no primary-secondary relationship between the primary account and the secondary account, or that the Quick Response Code is invalid.

In additional examples, the processing module 510 may compare the expiration time indicator with the request time to determine that the encoded image has expired. Alternatively or in addition, the processing module 510 may prohibit the privileged communication with the secondary client device in response to determination that the encoded image has expired.

Further, the processing module 510 may send instructions, for example HTML, to the secondary client device to cause the secondary client device to receive the encoded image from the primary client device.

Alternatively or in addition, the processing module 510 may generate the encoded image. The processing module may, in some examples, send the encoded image to the primary client device.

In further examples, the processing module 510 may repeatedly update, at a regular time interval, the encoded image to represent a new expiration time indicator. The processing module 510 may communicate, in response to the encoded image being updated, the encoded image to the secondary client device.

In some examples, the processing module 510 may send instructions to the second client device to update the expiration time indicator represented by the encoded image at a regular time interval.

In some examples, the processing module 510 may communicate a rule to the second client device that instructs the primary client device to regularly update the expiration time of the quick response code at a regular time interval.

The apparatus 500 may further include a decryption module 530, configured to decrypt the Quick Response Code, to obtain the information about the primary account and the time validity information. In some example, decryption module may decrypt the Quick Response code and/or information represented by the Quick Response Code. For example, the quick response code may be a type of encoded image. The decryption module may decrypt the encoded image. Alternatively or in addition, the decryption module may extract encoded information represented in the encoded image and decrypt the encoded information.

Figure 7:
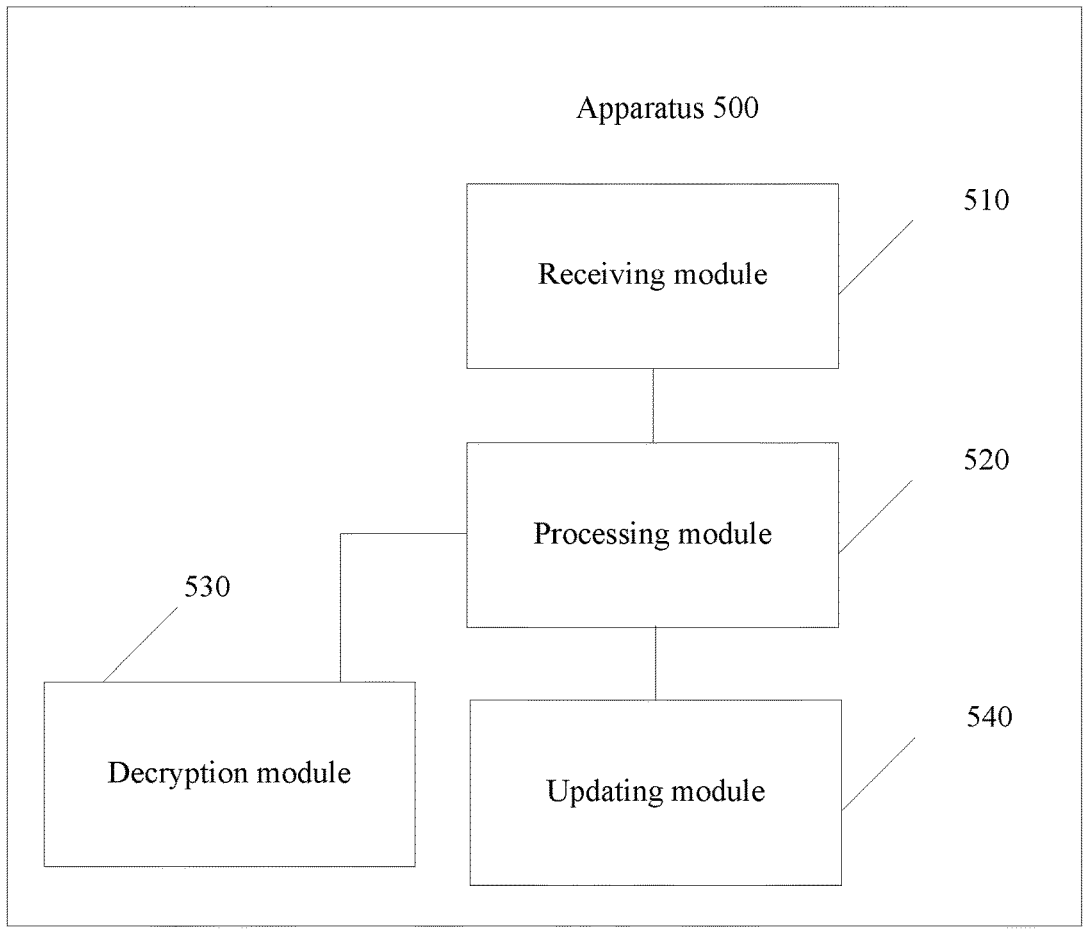
FIG. 7 is a schematic block diagram of an account login apparatus according to another embodiment of this application.

Optionally, as shown in FIG. 7, the apparatus further includes an updating module 540. The updating module 540 is configured to: instruct the primary account client to regularly update the Quick Response Code; or update the Quick Response Code, and send an updated Quick Response Code to the primary account client.

Alternatively or in addition, the updating module 540 may communicate a rule to the primary client device that instructs the primary client device to repeatedly update the expiration time information corresponding to an encoded image information at regular time interval. In some examples, the expiration time information comprises an expiration time. The updating module 540 may determine a receipt time of a login request is greater than an expiration time.

The receiving module of the apparatus is further configured to receive the Quick Response Code that is regularly updated by the primary account client, to process the login request sent by the secondary account client.

The apparatus 500 may correspond to the server mentioned in the foregoing specification, and can implement corresponding functions of the server. For brevity, details are not described herein again.

In this embodiment of this application, a secondary account is logged in to by using a Quick Response Code, so that login security and convenience can be improved. In addition, because information about the Quick Response Code has a valid duration, the secondary account is not permitted to be permanently logged in to. Therefore, the secondary account can be prevented from being maliciously used after being stolen. For example, the server may establish a login session in response to the login request. The server may terminate the login session in response to the Quick Response Code expiring. Further, the Quick Response Code can be encrypted, thereby further improving account login security.

Figure 8:
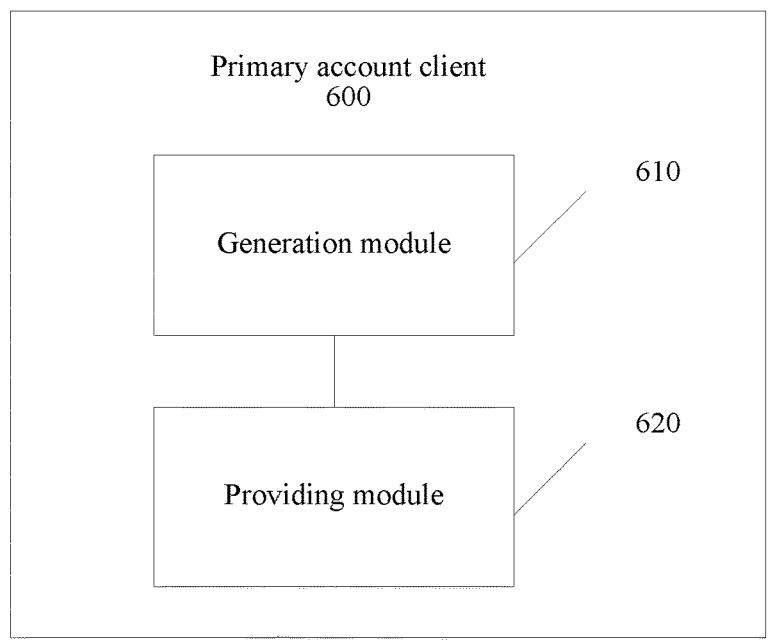
FIG. 8 is a schematic block diagram of an account login apparatus according to another embodiment of this application.

FIG. 8 is a schematic block diagram of an account login apparatus 600. As shown in FIG. 8, the apparatus 600 is a primary account client, and includes a generation module 610, configured to generate a Quick Response Code, the Quick Response Code including information about a primary account and time validity information of the Quick Response Code, and the time validity information being used for indicating a valid duration of the Quick Response Code; and a providing module 620, configured to provide the Quick Response Code to a secondary account client, so that the secondary account client sends a login request that includes the Quick Response Code to a server.

Optionally, the generation module 610 is specifically configured to:

generate an encrypted Quick Response Code in the primary account client.

Figure 9:
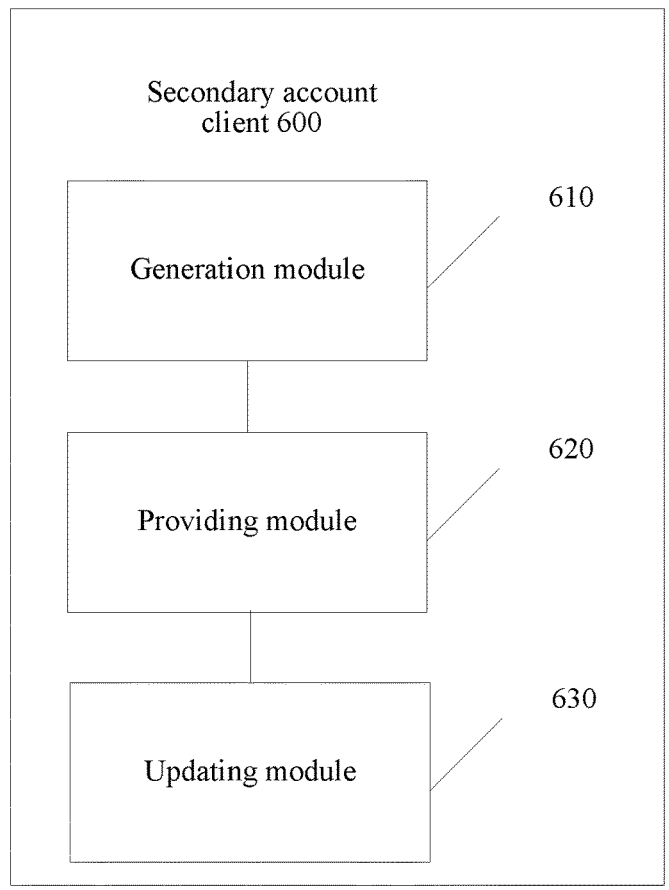
FIG. 9 is a schematic block diagram of an account login apparatus according to another embodiment of this application.

Optionally, as shown in FIG. 9, the apparatus 600 further includes an updating module 630, configured to:

update the Quick Response Code according to an instruction of the server; or update the Quick Response Code, and send an updated Quick Response Code to the server; or receive the updated Quick Response Code sent by the server.

Alternatively or in addition, the generation module 610 may communicate with a remote server that controls access to privileged information related to a secondary account associated with a primary account. In some examples, the generation module 610 may encode an encoded image with authentication information. The authentication information may include a primary account identifier and an expiration time indicator. The primary account identifier may correspond to the primary account. The providing module 620 may communicate to the encoded image to a secondary client device, the secondary client device associated with the secondary account. In some examples, the providing module may display the encoded image.

In some examples, the updating module 610 may receive a rule with an instruction for generating the encoded image. The rule comprises at least one of the primary account identifier and an expiration time indicator. The updating module may generate an updated encoded image based on the rule. Alternatively or in addition, the updating module 610 may generate an update encoded image at a regular time interval.

In some examples, the account login apparatus 600 may further include an encryption module. The encryption module may encrypt the authentication information and/or the encoded image. The encryption may receive encryption information. The encryption module may encrypt the authentication information and/or the encoded image according to the encryption information.

The apparatus 600 may correspond to the primary account client mentioned in the foregoing method embodiment of the specification, and can implement corresponding functions of the primary account client. For brevity, details are not described herein again.

In this embodiment of this application, a secondary account is logged in to by using a Quick Response Code, so that login security and convenience can be improved. In addition, because information about the Quick Response Code has a valid duration, the secondary account is not permitted to be permanently logged in to. Therefore, the secondary account can be prevented from being maliciously used after being stolen. Further, the Quick Response Code can be encrypted, thereby further improving account login security.

Figure 10:
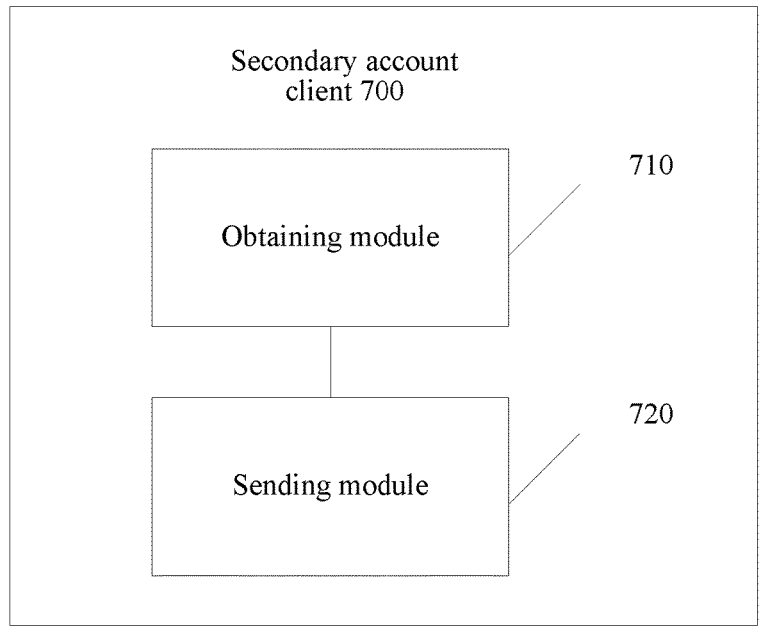
FIG. 10 is a schematic block diagram of an account login apparatus according to another embodiment of this application.

FIG. 10 is a schematic block diagram of an account login apparatus 700 according to an embodiment of this application. The apparatus 700 is a secondary account client, and includes:

an obtaining module 710, configured to obtain a Quick Response Code, the Quick Response Code including information about a primary account and time validity information of the Quick Response Code, and the time validity information being used for indicating a valid duration of the Quick Response Code; and a sending module 720, configured to send a login request to a server, the login request including information about a secondary account and the Quick Response Code.

The apparatus 700 may correspond to the secondary account client mentioned in the foregoing method embodiment of the specification, and can implement corresponding functions of the secondary account client. For brevity, details are not described herein again.

In this embodiment of this application, a secondary account is logged in to by using a Quick Response Code, so that login security and convenience can be improved. In addition, because information about the Quick Response Code has a valid duration, the secondary account is not permitted to be permanently logged in to. Therefore, the secondary account can be prevented from being maliciously used after being stolen. Further, the Quick Response Code can be encrypted, thereby further improving account login security.

Figure 11:
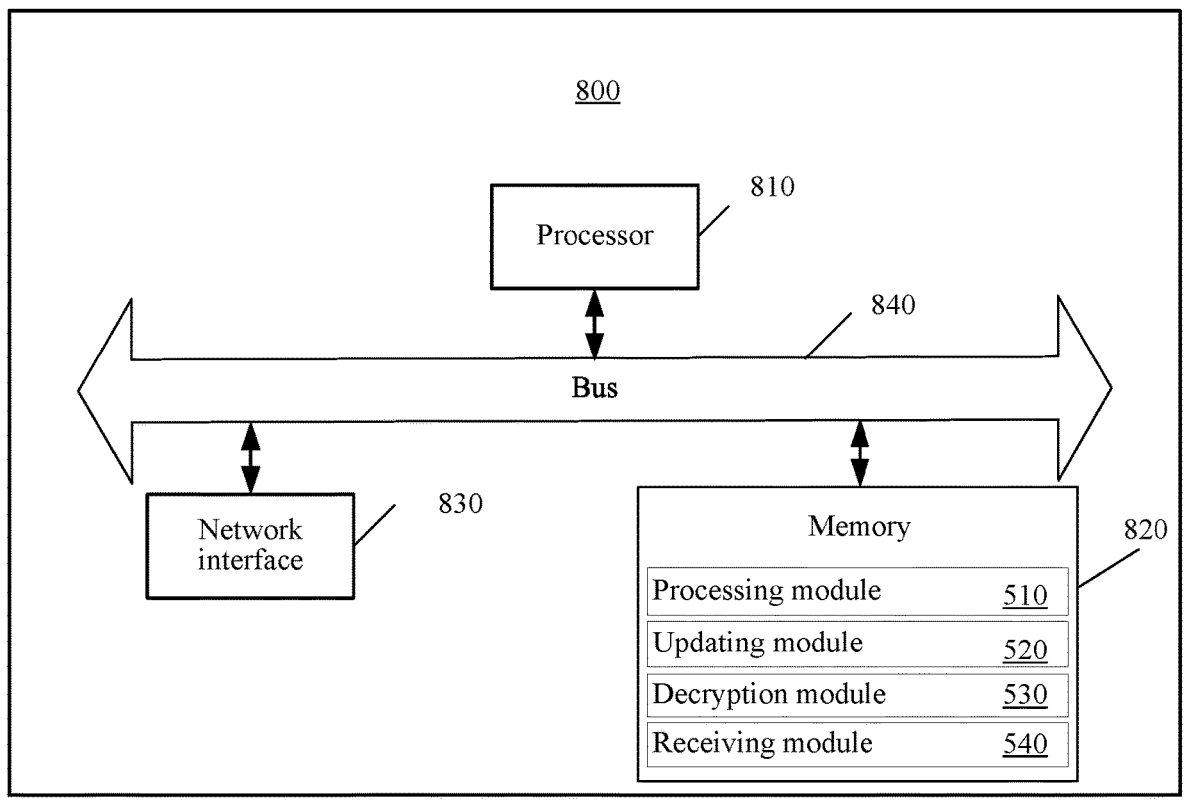
FIG. 11 is a schematic block diagram of an account login apparatus according to another embodiment of this application.

FIG. 11 is a schematic block diagram of an account login system 800 according to an embodiment of this application. The system 800 may include one or more of the primary account clients 510, 600. Alternatively or in addition, as shown in FIG. 11, the system 800 includes: a processor 810, a memory 820, a network interface 830, and a bus 840 that connects the processor 810, the memory 820 and the network interface 830. Program code is stored in the memory 820. The processor 810 invokes the program code of the memory 820 to perform the following processing:

receiving, by using the network interface 830, a login request sent by a secondary account client, the login request including information about a secondary account and a Quick Response Code, the Quick Response Code including information about a primary account and time validity information of the Quick Response Code, and the time validity information being used for indicating a valid duration of the Quick Response Code; and allowing a login by the secondary account client when it is determined, according to the login request, that there is a primary-secondary relationship between the primary account and the secondary account, and that the Quick Response Code is valid.

Optionally, the processor 810 invokes the program code of the memory 820 to further perform the following processing:

rejecting a login by the secondary account client when it is determined that there is no primary-secondary relationship between the primary account and the secondary account, or that the Quick Response Code is invalid.

Optionally, the Quick Response Code is an encrypted Quick Response Code. The processor 810 invokes the program code of the memory 820 to further perform the following processing:

decrypting the Quick Response Code after receiving the login request sent by the secondary account client, to obtain the information about the primary account and the time validity information.

Optionally, the processor 810 invokes the program code of the memory 820 to further perform the following processing:

instructing the primary account client to regularly update the Quick Response Code; or receiving the Quick Response Code that is regularly updated by the primary account client, to process the login request sent by the secondary account client; or updating the Quick Response Code, and sending an updated Quick Response Code to the primary account client.

The apparatus 800 may correspond to the server mentioned in the foregoing method embodiment of the specification, and can implement corresponding functions of the server. For brevity, details are not described herein again.

Figure 12:
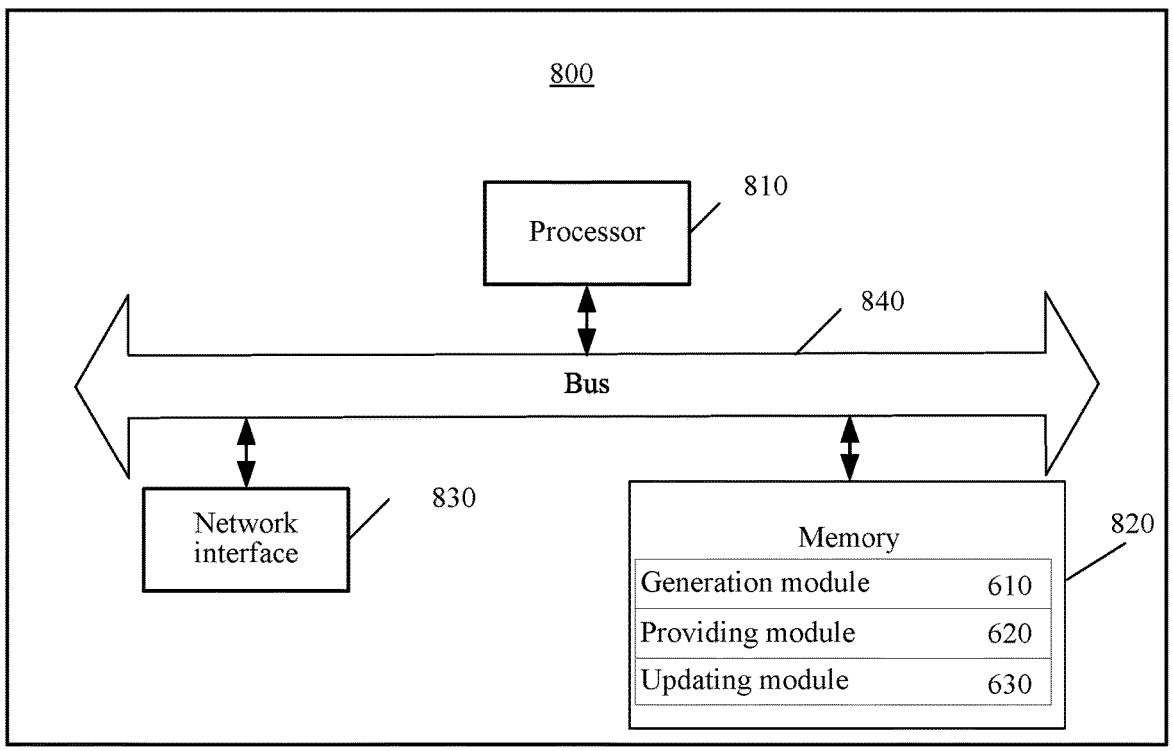
FIG. 12 is a schematic block diagram of an account login apparatus according to another embodiment of this application.
Figure 13:
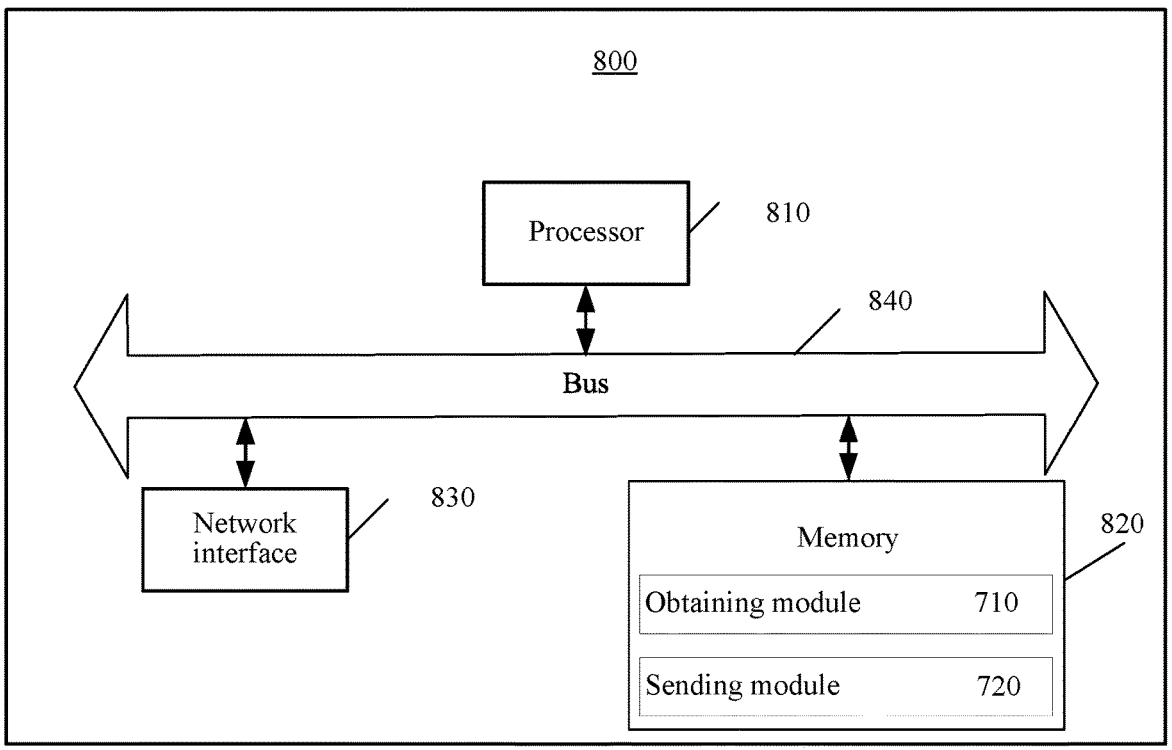
FIG. 13 is a schematic block diagram of an account login apparatus according to another embodiment of this application.

The account login system 800 may be implemented with additional, different, or fewer components than illustrated. For example, the processor 810 may be used to implement the logic of the server 530 and/or the apparatus 500. As shown in FIGS. 12 and 13, the account login system 800 may additionally implement the logic of one or more of the primary account clients 510, 600 and/or the secondary account clients 520, 600.

The processor 810 may be in communication with the memory 820. In one example, the processor 810 may also be in communication with additional elements, such as the network interface 830. Examples of the processor 810 may include a general processor, a central processing unit, a microcontroller, a server, an application specific integrated circuit (ASIC), a digital signal processor, a field programmable gate array (FPGA), and/or a digital circuit, analog circuit.

The processor 810 may be one or more devices operable to execute logic. The logic may include computer executable instructions or computer code embodied in the memory 820 or in other memory that when executed by the processor 810, cause the processor 810 to perform the features implemented by the logic of the modules and/or methods described herein including, for example, the receiving module 510, the processing module 520, the decryption module 530, the updating module 540, the obtaining model 710, the sending model 720, generation module 610, the providing module 620, the updating module 630, or the encryption module. The computer code may include instructions executable with the processor 810.

The memory 820 may be any device for storing and retrieving data or any combination thereof. The memory 820 may include non-volatile and/or volatile memory, such as a random access memory (RAM), a read-only memory (ROM), an erasable programmable read-only memory (EPROM), or flash memory. Alternatively or in addition, the memory 820 may include an optical, magnetic (hard-drive) or any other form of data storage device. As shown in FIG. 11, The memory 820 may include at least one of the processing module 510, the updating module 520, the decryption module 530, and/or the receiving module 540. Alternatively or in addition, the memory 820 may include the generation module, the providing module, and/or the updating module 630 as shown in FIG. 12. Alternatively or in addition, the memory 820 may include the obtaining module 710 and/or the sending module 720, as shown in FIG. 13.

The account login system may be implemented in many different ways. Each module, such as the receiving module 510, the processing module 520, the decryption module 530, the updating module 540, the obtaining model 710, the sending model 720, generation module 610, the providing module 620, the updating module 630, or the encryption module, may be hardware or a combination of hardware and software. For example, each module may include an application specific integrated circuit (ASIC), a Field Programmable Gate Array (FPGA), a circuit, a digital logic circuit, an analog circuit, a combination of discrete circuits, gates, or any other type of hardware or combination thereof. Alternatively or in addition, each module may include memory hardware, such as a portion of the memory 820, for example, that comprises instructions executable with the processor 810 or other processor to implement one or more of the features of the module. When any one of the module includes the portion of the memory that comprises instructions executable with the processor, the module may or may not include the processor. In some examples, each module may just be the portion of the memory 820 or other physical memory that comprises instructions executable with the processor 810 or other processor to implement the features of the corresponding module without the module including any other hardware. Because each module includes at least some hardware even when the included hardware comprises software, each module may be interchangeably referred to as a hardware module.

Some features are shown stored in a computer readable storage medium (for example, as logic implemented as computer executable instructions or as data structures in memory). All or part of the system and its logic and data structures may be stored on, distributed across, or read from one or more types of computer readable storage media. Examples of the computer readable storage medium may include a hard disk, a floppy disk, a CD-ROM, a flash drive, a cache, volatile memory, non-volatile memory, RAM, flash memory, or any other type of computer readable storage medium or storage media. The computer readable storage medium may include any type of non-transitory computer readable storage medium, such as a CD-ROM, a volatile memory, a non-volatile memory, ROM, RAM, or any other suitable storage device.

The processing capability of the system 800 may be distributed among multiple entities, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors, and may be implemented in a library, such as a shared library (for example, a dynamic link library (DLL)).

In this embodiment of this application, a secondary account is logged in to by using a Quick Response Code, so that login security and convenience can be improved. In addition, because information about the Quick Response Code has a valid duration, the secondary account is not permitted to be permanently logged in to. Therefore, the secondary account can be prevented from being maliciously used after being stolen. Further, the Quick Response Code can be encrypted, thereby further improving account login security.

FIG. 12 is a schematic block diagram of an account login system 800 according to an embodiment of this application. The account login system 800 may include the one or more of the primary account clients 510, 600. As shown in FIG. 12, the account login system 800 may additionally include 800: a processor 810, a memory 820, a network interface 830, and a bus 840 that connects the processor 810, the memory 820 and the network interface 830. Program code is stored in the memory 820. The processor 810 invokes the program code of the memory 820 to perform the following processing:

generating a Quick Response Code, the Quick Response Code including information about a primary account and time validity information of the Quick Response Code, and the time validity information being used for indicating a valid duration of the Quick Response Code; and providing the Quick Response Code to a secondary account client, so that the secondary account client sends a login request that includes the Quick Response Code to a server.

Optionally, the processor 810 invokes the program code of the memory 820 to specifically perform the following processing:

generating an encrypted Quick Response Code.

Optionally, the processor 810 invokes the program code of the memory 820 to further perform the following processing:

generating an encrypted Quick Response Code;

updating, by the primary account client, the Quick Response Code according to an instruction of the server; or updating, by the primary account client, the Quick Response Code, and sending an updated Quick Response Code to the server; or receiving, by the primary account client, the updated Quick Response Code sent by the server.

The apparatus 800 may correspond to the primary account client mentioned in the foregoing method embodiment of the specification, and can implement corresponding functions of the primary account client. For brevity, details are not described herein again.

In this embodiment of this application, a secondary account is logged in to by using a Quick Response Code, so that login security and convenience can be improved. In addition, because information about the Quick Response Code has a valid duration, the secondary account is not permitted to be permanently logged in to. Therefore, the secondary account can be prevented from being maliciously used after being stolen. Further, the Quick Response Code can be encrypted, thereby further improving account login security.

FIG. 13 is a schematic block diagram of an account login apparatus 800 according to an embodiment of this application. The apparatus 800 is a secondary account client. As shown in FIG. 13, the apparatus 800 includes: a processor 810, a memory 820, a network interface 830, and a bus 840 that connects the processor 810, the memory 820 and the network interface 830. Program code is stored in the memory 820. The processor 810 invokes the program code of the memory 820 to perform the following processing:

obtaining a Quick Response Code, the Quick Response Code including information about a primary account and time validity information of the Quick Response Code, and the time validity information being used for indicating a valid duration of the Quick Response Code; and sending, by using the network interface 830, a login request to a server, the login request including information about a secondary account and the Quick Response Code.

The apparatus 800 may correspond to the secondary account client mentioned in the foregoing method embodiment of the specification, and can implement corresponding functions of the secondary account client. For brevity, details are not described herein again.

In this embodiment of this application, a secondary account is logged in to by using a Quick Response Code, so that login security and convenience can be improved. In addition, because information about the Quick Response Code has a valid duration, the secondary account is not permitted to be permanently logged in to. Therefore, the secondary account can be prevented from being maliciously used after being stolen. Further, the Quick Response Code can be encrypted, thereby further improving account login security.

In addition, functional modules in the embodiments of the present invention may be integrated into one processing unit, or each of the modules may exist alone physically, or two or more modules may be integrated into one unit. The integrated unit may be implemented in a form of hardware, or may be implemented in a form of a software functional unit, or may be implemented in a form of a combination of software and hardware. The functional modules in the embodiments may be located on one terminal or network node, or may be distributed on multiple terminals or network nodes.

In addition, each embodiment of the present invention may be implemented by a data processing program executed by a data processing device such as a computer. Apparently, the data processing program constitutes the present disclosure. In addition, generally, a data processing program stored in a storage medium is directly read from the storage medium for execution or the program is installed on or replicated to a storage device (such as a hard disk or memory) of a data processing device for execution. Therefore, such a storage medium also constitutes the present disclosure. The storage medium may use any type of recording manner, such as a paper storage medium (such as a paper tape), a magnetic storage medium (such as a soft disk, a hard disk, or a flash memory), an optical storage medium (such as a CD-ROM), or a magneto-optical storage medium (such as an MO).

Therefore, the present disclosure further provides a storage medium, which stores a data processing program. The data processing program is used for executing any embodiment of the foregoing method of the present disclosure.

A person of ordinary skill in the art may understand that all or some of the steps of the embodiments may be implemented by hardware or a program instructing related hardware. The program may be stored in a computer readable storage medium. The storage medium may include: a read-only memory, a magnetic disk, or an optical disc.

The foregoing descriptions are merely exemplary embodiments of the present invention, but are not intended to limit the present disclosure. Any modification, equivalent replacement, or improvement made without departing from the spirit and principle of the present disclosure should fall within the protection scope of the present disclosure.

All of the discussion, regardless of the particular implementation described, is illustrative in nature, rather than limiting. For example, although selected aspects, features, or components or modules of the implementations are depicted as being stored in memories, all or part of the system or systems may be stored on, distributed across, or read from other computer readable storage media, for example, secondary storage devices such as hard disks, flash memory drives, floppy disks, and CD-ROMs. Moreover, the various modules and screen display functionality is but one example of such functionality and any other configurations encompassing similar functionality are possible.

The respective logic, software or instructions for implementing the processes, methods and/or techniques discussed above may be provided on computer readable storage media. The functions, acts or tasks illustrated in the figures or described herein may be executed in response to one or more sets of logic or instructions stored in or on computer readable media. The functions, acts or tasks are independent of the particular type of instructions set, storage media, processor or processing strategy and may be performed by hardware, integrated circuits, firmware, micro code and the like, operating alone or in combination. Likewise, processing strategies may include multiprocessing, multitasking, parallel processing and the like. In one example, the instructions are stored on a removable media device for reading by local or remote systems. In other examples, the logic or instructions are stored in a remote location for transfer through a computer network or over telephone lines. In yet other examples, the logic or instructions are stored within a given computer, central processing unit ("CPU"), graphics processing unit ("GPU"), or system.

Furthermore, although specific components are described above, methods, systems, and articles of manufacture described herein may include additional, fewer, or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, entities, and other data structures may be separately stored and managed, may be incorporated into a single memory or database, may be distributed, or may be logically and physically organized in many different ways. The components may operate independently or be part of a same program or apparatus. The components may be resident on separate hardware, such as separate removable circuit boards, or share common hardware, such as a same memory and processor for implementing instructions from the memory. Programs may be parts of a single program, separate programs, or distributed across several memories and processors.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed While various embodiments have been described, it will be apparent to those of ordinary skill in the art that many more embodiments and implementations are possible. Accordingly, the embodiments described herein are examples, not the only possible embodiments and implementations. The subject-matter of the disclosure may also relate, among others, to the following aspects.

In a first aspect, an account login method may include receiving a login request sent by a secondary account client, the login request comprising information about a secondary account and a Quick Response Code. The Quick Response Code may include information about a primary account and time validity information of the Quick Response Code. The time validity information may be used for indicating a valid duration of the Quick Response Code. The account login method may further include allowing a login by the secondary account client when it is determined, according to the login request, that there is a primary-secondary relationship between the primary account and the secondary account, and that the Quick Response Code is valid.

The account login method may further include rejecting a login by the secondary account client when it is determined that there is no primary-secondary relationship between the primary account and the secondary account, or that the Quick Response Code is invalid.

In some examples, the Quick Response Code may include an encrypted Quick Response code. After the receiving a login request sent by a secondary account client, the account login method may further include decrypting the Quick Response Code, to obtain the information about the primary account and the time validity information.

The account login method may further include instructing the primary account client to regularly update the Quick Response Code. Alternatively or in addition, the account login method may include the receiving the Quick Response Code that is regularly updated by the primary account client, to process the login request sent by the secondary account client. Alternatively or in addition, the account login method may include updating the Quick Response Code, and sending an updated Quick Response Code to the primary account client.

In a second aspect, an login account method may include generating, by a primary account client, a Quick Response Code. The Quick Response Code may include information about a primary account and time validity information of the Quick Response Code. The time validity information may be used for indicating a valid duration of the Quick Response Code. The account login method may further include providing, by the primary account client, the Quick Response Code to a secondary account client, so that the secondary account client sends a login request that comprises the Quick Response Code to a server In some examples, the account login method of the second aspect may further include generating, by the primary account client, an encrypted Quick Response Code. Alternatively or in addition, the account login method may further include updating, by the primary account client, the Quick Response Code according to an instruction of the server; or updating, by the primary account client, the Quick Response Code, and sending an updated Quick Response Code to the server; or receiving, by the primary account client, the updated Quick Response Code sent by the server.

In a third aspect, the account login method may include obtaining, by a secondary account client, a Quick Response Code. The Quick Response Code may include information about a primary account and time validity information of the Quick Response Code. The time validity information may be used for indicating a valid duration of the Quick Response Code. The account login method may further include sending, by the secondary account client, a login request to a server, the login request comprising information about a secondary account and the Quick Response Code.

In a fourth aspect, an account login apparatus may include a receiving module. The receiving module may be configured to receive a login request sent by a secondary account client. The login request may include information about a secondary account and a Quick Response Code. The Quick Response Code may include information about a primary account and time validity information of the Quick Response Code. The time validity information may be used for indicating a valid duration of the Quick Response Code. The account login apparatus may further include a processing module. The processing module may be configured to allow a login by the secondary account client when it is determined, according to the login request, that there is a primary-secondary relationship between the primary account and the secondary account, and that the Quick Response Code is valid.

In some examples, the processing module according to the fourth aspect may reject a login by the secondary account client when it is determined that there is no primary-secondary relationship between the primary account and the secondary account, or that the Quick Response Code is invalid. Alternatively or in addition, the Quick Response Code may include an encrypted Quick Response code. The account login apparatus according to the fourth aspect may further include a decryption module. The decryption module may decrypt the Quick Response Code, to obtain the information about the primary account and the time validity information.

In some examples, the login apparatus of the fourth aspect may further include an updating module. The updating module may instruct the primary account client to regularly update the Quick Response Code. Alternatively or in addition, the updating module may update the Quick Response Code and send an updated Quick Response Code to the primary account client. In some examples, the receiving module of the fourth aspect may be further receive the Quick Response Code that is regularly updated by the primary account client, to process the login request sent by the secondary account client.

In a fifth aspect, an account login apparatus may include a primary account client. For example, the account login apparatus may include a generation module. The generation module may generate a Quick Response Code. The Quick Response Code may include information about a primary account and time validity information of the Quick Response Code. The time validity information may be used for indicating a valid duration of the Quick Response Code. The account login apparatus may further include a providing module. The providing module may provide the Quick Response Code to a secondary account client, so that the secondary account client sends a login request that comprises the Quick Response Code to a server.

In some examples, the login apparatus according to the fifth aspect may include a generation module. The generation module may generate an encrypted Quick Response Code in the primary account client. Alternatively or in addition, the login apparatus according to the fifth aspect may include an updating module. The updating module may update the Quick Response Code according to an instruction of the server, update the Quick Response Code, and send an updated Quick Response Code to the server, and/or receive the updated Quick Response Code sent by the server.

In a sixth aspect, the account login apparatus may include a secondary account client. The account login apparatus may include an obtaining module. The obtaining module may obtain a Quick Response Code. The Quick Response Code may include information about a primary account and time validity information of the Quick Response Code. The time validity information may be used for indicating a valid duration of the Quick Response Code. The account login apparatus may further include a sending module. The sending module may send a login request to a server. The login request may include information about a secondary account and the Quick Response Code.

What is claimed is:

1. A system comprising:
a server, the server including a memory, and a processor couple to the memory, the processor configured to:
receive a login request to login to a secondary account sent by a secondary client device prior to a login to the secondary account, the login request including a secondary account identifier and an encoded quick response code presented by a primary client device and including a primary account identifier associated with a primary account and an expiration time indicator, the primary account corresponding to the primary client device, the encoded quick response code scanned by the secondary client device to generate the login request, the secondary account identifier associated with the secondary account, the secondary account corresponding to the secondary client device;
decode the encoded quick response code to identify the primary account identifier and the expiration time indicator represented in the encoded quick response code;
determine that the secondary account is linked with the primary account based on the primary account identifier in the decoded quick response code;
determine, based on the expiration time indicator, that the encoded quick response code is not expired; and
allow the login to the secondary account and authorize privileged information related to the secondary account to be communicated to the secondary client device in response to the secondary account being linked with the primary account and determination that the encoded quick response code has not expired.

2. The system of claim 1, wherein the processor is further configured to:
compare the expiration time indicator with a receipt time of the login request to determine that the encoded quick response code has expired; and
prohibit the privileged communication with the secondary client device in response to determination that the encoded quick response code has expired.

3. The system of claim 1, wherein the processor is further configured to:
send an instruction to the secondary client device to cause the secondary client device to receive the encoded quick response code from the primary client device.

4. The system of claim 1, wherein the processor is further configured to send an instruction to the primary client device that causes the primary client device to update the expiration time indicator represented by the encoded quick response code at a regular time interval.

5. The system of claim 1, wherein the processor is further configured to:
generate the encoded quick response code; and
send the encoded quick response code to the primary client device.

6. The system of claim 1, wherein the processor is configured to:
repeatedly update, at a regular time interval, the expiration time indicator encoded by the encoded quick response code; and
communicate, in response to the encoded quick response code being updated, the encoded image quick response code to the secondary client device.

7. A method, comprising
receiving a login request to login to a secondary account from a secondary client device prior to a login to the secondary account, the login request including a secondary account identifier and an encoded quick response code presented by a primary client device and including a primary account identifier associated with a primary account and an expiration time indicator, the primary account corresponding to the primary client device, the encoded quick response code scanned by the secondary client device to generate the login request, the secondary account identifier associated with the secondary account;
decoding the encoded quick response code to identify the primary account identifier and the expiration time indicator;
determining that the secondary account is linked with the primary account based on the primary account identifier in the decoded quick response code;
determining, based on the expiration time indicator, that the encoded quick response code has not expired; and
allowing the login to the secondary account and granting, to the secondary client device, access to privileged information related to the secondary account in response to the secondary account being linked with the primary account and determination that the encoded quick response code has not expired.

8. The method of claim 7, wherein the encoded information is encrypted, wherein the step of decoding the encoded information comprises decrypting the encoded quick response code.

9. The method of claim 7, wherein determining that the encoded quick response code has not expired further comprises:
identifying, based on the expiration time information, an expiration time; and
determining a receipt time of the login request is less than the expiration time.

10. The method of claim 7, further comprising:
determining, based on the expiration time information, that the encoded quick response code has expired; and
denying the login request in response to the encoded quick response code being expired.

11. The method of claim 7, further comprising sending, to the secondary client device, an instruction to:
cause the encoded quick response code to be captured by the second client device; and
generate the login request.

12. The method of claim 7, further comprising:
sending, to primary client device, encryption information used to encrypt the encoded quick response code; and
decrypting the encoded image based on the encryption information.

13. A non-transitory computer readable storage medium comprising a plurality of instructions executable by a processor to:
receive a login request to login to a secondary account sent by a secondary client device prior to a login to the secondary account, the login request including a secondary account identifier and an encoded quick response code presented by a primary client device and including a primary account identifier associated with a primary account and an expiration time indicator, the primary account corresponding to the primary client device, the encoded quick response code scanned by the secondary client device to generate the login request, the secondary account identifier associated with the secondary account, the secondary account corresponding to the secondary client device;
decode the encoded quick response code to identify the primary account identifier and the expiration time indicator represented in the encoded quick response code;
determine that the secondary account is linked with the primary account based on the primary account identifier in the decoded quick response code;
determine, based on the expiration time indicator, that the encoded quick response code is not expired; and
allow the login to the secondary account and authorize privileged information related to the secondary account to be communicated to the secondary client device in response to the secondary account being linked with the primary account and determination that the encoded quick response code has not expired.

14. The non-transitory computer readable storage medium of claim 13, further comprising instructions executable by the processor to:
compare the expiration time indicator with a receipt time of the login request to determine that the encoded quick response code has expired; and
prohibit the privileged communication with the secondary client device in response to determination that the encoded quick response code has expired.

15. The non-transitory computer readable storage medium of claim 13, further comprising instructions executable by the processor to:
send an instruction to the secondary client device to cause the secondary client device to receive the encoded quick response code from the primary client device.

16. The non-transitory computer readable storage medium of claim 13, further comprising instructions executable by the processor to send an instruction to the primary client device that causes the primary client device to update the expiration time indicator represented by the encoded image at a regular time interval.

17. The non-transitory computer readable storage medium of claim 13, further comprising instructions executable by the processor to:
generate the encoded quick response code; and
send the encoded quick response code to the primary client device.

18. The non-transitory computer readable storage medium of claim 13, further comprising instructions executable by the processor to:
repeatedly update, at a regular time interval, the expiration time indicator encoded by the encoded quick response code; and
communicate, in response to the encoded quick response code being updated, the encoded quick response code to the secondary client device.

* * * * *